Patented Oct. 28, 1952

2,615,782

UNITED STATES PATENT OFFICE 2,615,782

MODIFICATION OF KERATIN

John W. Haefele, Cincinnati, Ohio, assignor to The Procter & Gamble Company, Ivorydale, Ohio, a corporation of Ohio No Drawing. Application August 11, 1950, Serial No. 178,981

19 Claims. (Cl. 8—128)

The present invention relates to the modification of keratin and to the chemical treatment of materials containing keratin, such as hair and wool. More particularly the invention relates to an improved process for the conditioning of hair or wool fibers and to the products so produced.

It has been proposed heretofore to treat reduced keratin with substituted or unsubstituted alkyl halides to convert sulfhydryl groups to thioethers, and particular reference is had to U. S. Patent 2,418,071, issued March 25, 1947, to Harris et al. In such a process the keratin is reacted with a mercaptan, for example, to produce reduced keratin, as follows:

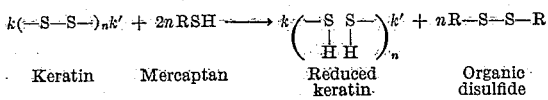

| Keratin | Mercaptan | Reduced keratin | Organic disulfide |

The reduced keratin is then rinsed and subsequently reacted with an alkyl halide, for example, as follows:

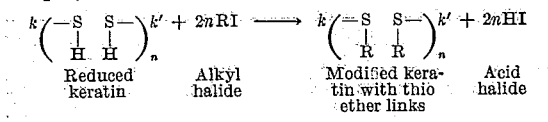

| Reduced keratin | Alkyl halide | Modified keratin with thio ether links | Acid halide |

It is an object of my invention to provide a process for the advantageous modification of the chemical and physical properties of keratin-containing substances while retaining in the modified keratin the characteristic presence of disulfide linkages.

It is a further object of the invention to provide such modified keratin-containing substances. Still a further object of the invention is the provision of novel compositions suitable for use in the modification of keratin-containing substances.

In accordance with my invention, the above objects are achieved by reacting the reduced keratin with at least one organic thiosulfuric acid or water-soluble salt of same to convert reduced keratin to disulfide containing the organic group of the organic thiosulfate as follows:

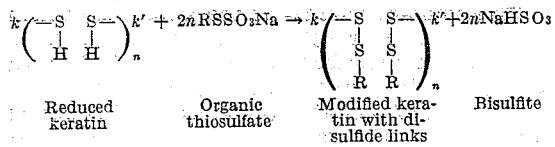

| Reduced keratin | Organic thiosulfate | Modified keratin with disulfide links | Bisulfite |

In the above formulas and reactions R represents an organic radical and the keratin molecule has been illustrated by the following simplified formula understood by those versed in the art:

$k(\text{—S—S—})_n k'$ in which $k$ and $k'$ are polypeptide chains which are the same or substantially similar in nature and which are connected through the disulfide (—S—S—) linkage, and $n$ is a number greater than 1.

It will be observed from the above that in the products of my invention, at least some of the disulfide linkages of the original keratin have been disrupted and changed to disulfide linkages of the type.

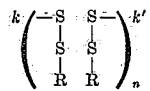

or

$k(\text{—S—S—R R—S—S—})_n k'$ wherein the organic groups R, each of which can be alkyl, alkenyl, or substituted alkyl or alkenyl, are connected to the polypeptide chain $k$ or $k'$ through the disulfide linkage, $n$ being a number greater than 1.

The invention and its various applications will be more fully understood from the following examples, wherein parts are by weight, but it is to be borne in mind that these examples are to be taken as illustrative and not as limitations on the scope of the appended claims.

*Example 1.*—The hair of a living human subject was wound on curlers and reduced in a manner customarily practiced in cold hair waving operations with a commercial reducing lotion containing about 6% ammonium thioglycolate as the active reducing agent. After a 20 minute contact period at about body temperature, the reduced hair, while wound on the curlers, was rinsed with water until substantially all of the excess thioglycolate solution was removed.

The hair on one half of the head was then thoroughly saturated with a 2% solution of ammonium lauryl thiosulfate. After 5 minutes contact, the ammonium lauryl thiosulfate solution was rinsed from the hair. Thereafter the customary fixing solution of potassium bromate was applied to the entire head in the conventional manner. The hair was then set and dried and examined.

That portion of the hair which was treated with the ammonium lauryl thiosulfate had superior luster and softness as judged by a panel of expert observers who were not informed as to the method of treatment.

Example 2.—A solution of sodium glyceryl thiosulfate was prepared by heating together equivalent quantities of glycerin alpha chlorhydrin and sodium thiosulfate in water. A portion of the solution containing 13 grams of sodium glyceryl thiosulfate was diluted to 1 liter and the pH was adjusted to 8.2 by the addition of ammonia. This diluted solution was compared with a 1% solution of sodium chlorite as a fixing agent in a half-head cold permanent wave comparison in which the hair of a living human subject was wound on curlers and reduced with a commercial reducing lotion as in Example 1.

That half of the hair which had been fixed with the sodium glyceryl thiosulfate was more lustrous than was the half fixed with the sodium chlorite solution as judged by observers unfamiliar with the treatment.

Example 3.—In this example the effect of treating reduced and unreduced wool with sodium lauryl thiosulfate was studied.

Two swatches of wood cloth, each 6" x 6", were reduced by treatment with an excess of a 4% solution of ammonium thioglycolate at a pH of 9.3 and 100° F. for 40 minutes. The cloth samples were then rinsed for 1 hour in running water.

One of the swatches of reduced wool, and a corresponding swatch of unreduced original wool, were exposed to an excess of a 2% solution of sodium lauryl thiosulfate at 120° F. for 40 minutes. The two swatches thus treated were rinsed in running water for 1 hour.

Swatches of unreduced wool, unreduced wool treated with sodium lauryl thiosulfate, reduced wool, and reduced wool treated with sodium lauryl thiosulfate were subjected to a washing procedure with a soap solution in accordance with a standardized procedure as follows. Washing was conducted in a model H-46 Easy washer, one pound size, and included agitating the swatches for 40 minutes at 115° F. with 15 liters of a 0.4% solution of a commercially available coconut-tallow laundry soap (sold under the trade name Oxydol), draining off the soap solution, and agitating the washed swatches with 15 liters of rinse water at 115° F. for 20 minutes. The rinse water was drained off. The swatches were given a spin drying and then allowed to dry in air. The conditions chosen for this washing procedure were designed to effect in one wash an amount of shrinkage which would be observed only after a number of washings under normal conditions.

The per cent of shrinkage in area was greatly reduced by treatment of the reduced wool with sodium lauryl thiosulfate as will be noted from the following results.

| Treatment of Wool Cloth | Percent Area Shrinkage in Washing |
|---|---|
| None | 46 |
| Sodium lauryl thiosulfate without previous treatment with ammonium thioglycolate | 34 |
| Ammonium thioglycolate without subsequent treatment with sodium lauryl thiosulfate | 27 |
| Ammonium thioglycolate followed by sodium lauryl thiosulfate | 12 |

Example 4.—A switch of brown hair was reduced for 20 minutes at about 100° F. with a commercial reducing lotion containing about 6% ammonium thioglycolate. The sample of reduced hair was rinsed thoroughly and then treated with an excess of a 2% solution of decyl thiosulfate at a pH of about 8.

A similar switch of the same hair was treated in the same way except that a 1% solution of sodium chlorite was used in place of the decyl thiosulfate solution.

Both of the above samples were thoroughly rinsed and dried and compared for luster. The switch of hair treated with decyl thiosulfate had superior luster as judged by a panel of experts unfamiliar with the method of treatment.

Another switch of the same hair was reduced as above described and then treated with an excess of a 2% solution of decyl thiosulfate to which ammonia had been added to raise the pH to 10.5. This sample, after rinsing and drying, was found to be about equal in luster to the switch of hair treated with decyl thiosulfate at the lower pH above described, but was somewhat oilier. The switch was shampooed with a commercial alkyl sulfate synthetic shampoo along with the switch treated with sodium chlorite. The two shampooed switches were compared by a panel of experts who were unfamiliar with the method of treatment. That switch which had been treated with decyl thiosulate was judged by the panel to have superior luster and softness.

Example 5.—A 6" x 6" swatch of wool flannel which had been extracted with ethanol was dried for 2 hours at 230° F. and weighed. The sample of flannel was then reduced by contact with an excess of a commercial reducing solution containing about 6% ammonium thioglycolate as the reducing agent for 20 minutes at 100° F. The cloth sample was then rinsed in running water for 1 hour, after which it was squeezed damp-dry in a towel. The thus treated swatch was laid flat in a shallow tray and covered with a solution containing 3 grams of benzyl thiosulfate in 150 ml. of water. After the cloth had been exposed to this solution for 22½ hours at room temperature, it was rinsed for 1 hour in running water, air dried and extracted for 8 hours in a continuous Soxhlet extractor with ethanol. The sample of cloth was first air dried, then oven dried for 2 hours at 230° F. A gain in weight of 2.19% over the starting weight was observed. Also, the thus treated sample shrank only 4% when subjected to the washing procedure described in Example 3, whereas the untreated wool flannel shrank 27% under the same conditions of washing.

Sodium phenyl thiosulfate ($C_6H_5SSO_3Na$) can be sustituted for the benzyl thiosulfate of the above example, a gain in weight and shrink resistance being noted.

Example 6.—Each of five 6" x 6" swatches of ethanol extracted wool flannel was dried at 220° F., accurately weighed and then reduced by 20 minutes' exposure at room temperature to an excess of a commercial cold hair waving solution containing about 6% ammonium thioglycolate. The swatches were rinsed thoroughly in water and then soaked in an excess of a dilute solution of glyceryl thiosulfate.

Five similar swatches of the same wool which had been dried, weighed, reduced and rinsed in the manner described above were soaked in an excess of a 1% potassium bromate solution.

Each set of 5 swatches was thoroughly rinsed and dried for 2 hours at 220° F. Accurate weighings were made and the changes in weight over the original sample were noted. The swatches treated with glyceryl thiosulfate showed weight gains whereas the swatches treated with potassium bromate showed weight losses as follows:

*Per cent change in weight*

| Glyceryl Thiosulfate | Potassium Bromate |
|---|---|
| +0.55 | −0.80 |
| +0.75 | −0.86 |
| +0.54 | −0.59 |
| +0.76 | −0.57 |
| +0.63 | −0.67 |
| Mean +0.65 | −0.70 |

The weight losses were attributed to treatment with ammonium thioglycolate solution and not to the potassium bromate solution. Thus if it is assumed that all swatches of flannel lost an average of 0.7% in weight during reduction, then the total gain in weight from the glyceryl thiosulfate treatment may be considered as 0.65 plus 0.70, or 1.35%.

*Example 7.*—A 12" x 12" swatch of wool flannel weighing 21.67 grams at 73° F. and 55% relative humidity was reduced in 149 grams of a solution having a pH of 9.3 and prepared by admixture of the following:

| | Grams |
|---|---|
| Mercapto ethanol | 45 |
| Water | 850 |
| Ammonia (NH₃) | 43.1 |
| 10% solution of hydrogen peroxide | 25 |
| Sodium bisulfite | 35 |
| Alkyl benzene sulfonate | 0.4 |

In the mixture thus formed the peroxide oxidized the mercaptan (mercapto ethanol) to disulfide and the sodium bisulfite reacted with the disulfide to produce mercaptan and the corresponding organic thiosulfate.

After the swatch was exposed to the solution for 30 minutes at 110° F., it was removed, rinsed with water under the faucet, and then rinsed for 20 minutes in a vigorous flow of running water.

3.5 grams of propyl thiosulfate were dissolved in 150 ml. of water and the reduced and rinsed wool swatch was soaked in this solution for 21½ hours at 100° F. The swatch was then rinsed for 1½ hours in running water, and then subjected to the washing procedure described in Example 3, along with a swatch of a corresponding sample of untreated wool flannel.

The original wool flannel showed an area shrinkage of about 30%, but the sample which was treated with propyl thiosulfate after reduction shrank only 6%.

When the treated and original wool swatches were soaked in a bath containing 0.75% of sulfone acid blue B dye for the same length of time, the treated swatch accepted and adsorbed the dye more readily as was indicated by its deeper blue color.

In an auxiliary example a swatch of the same wool flannel was reduced and subsequently treated with a solution of 5 grams of n-octyl thiosulfate dissolved in 150 ml. of water. After the treated swatch was rinsed it was subjected to the standardized washing procedure and an area shrinkage of only 2%, as compared with 30% for the original cloth, was noted.

*Example 8.*—Two swatches of wool, each 3¼" x 3¼", were cut from a piece of wool flannel which had been previously extracted with petroleum ether and alcohol. Each swatch weighed about 1½ grams. One swatch was covered with a commercial hair waving lotion containing about 6% ammonium thioglycolate and a small amount of alkyl benzene sulfonate to increase wetting action. The second was covered with distilled water containing the same amount of alkyl benzene sulfonate. Both swatches were heated for about 20 minutes at 100° F. in the respective solutions and then rinsed for 1½ hours in running water.

The swatch of wool reduced with the ammonium thioglycolate solution was placed in 300 ml. of water containing 0.5 gram of sodium pentachlorobenzyl thiosulfate and heated for 16 hours at 100° F.

The control sample was immersed in 300 ml. of water and heated at 100° F. for 16 hours. This latter swatch and that treated with pentachlorobenzyl thiosulfate were each separately rinsed in running water for ½ hour and extracted for 6 hours in a Soxhlet extractor with ethanol.

Both swatches were then subjected to attack by mold *Chaetomium globosum*. That swatch which had been reduced and neutralized with the pentachlorobenzyl thiosulfate was definitely more resistant to attack by the mold than was the control swatch.

*Example 9.*—A swatch of wool flannel approximately 11" x 13" and weighing 20.90 grams at 73° F. and 55% relative humidity was reduced at 115° F. for 30 minutes with 162.5 grams of a commercial hair waving lotion containing about 6% ammonium thioglycolate as the reducing agent. The thus treated swatch was rinsed for 20 minutes in running water, then pressed damp-dry in a towel. It was then soaked in a mixture of 13 grams of 33.6% disodium carboxymethyl thiosulfate and 137 grams of water for 3½ hours at 166° F.

After the treated swatch of wool cloth was thoroughly rinsed and dried, it was dropped into a beaker of distilled water simultaneously with a sample of the original wool flannel. The reduced swatch which was reacted with disodium carboxymethyl thiosulfate was more easily wet by water than the original wool, as shown by its tendency to absorb water more rapidly.

When a swatch of the same wool flannel above employed was treated with a mixture of sodium thiohydracrylate (mercaptan) and disodium carboxymethyl thiosulfate, such that the ratio of mercaptan to thiosulfate was 1:1.6, the total solids of the solution being about 11% of a total weight of 134 grams and treatment being for 16 hours at room temperature, a gain in weight of 1.4% was observed after the treated sample was rinsed and dried. This swatch of treated wool flannel was also more easily wet than the original wool.

*Example 10.*—48 wool socks which had not been shrinkproofed were soaked in water to remove the temporary set imparted in manufacture. 24 of these socks were then retained as controls and the remaining 24 were reduced with the following reducing solution, about 250 ml. of lotion per sock being employed:

2 parts mercapto ethanol
1 part ammonium sulfite—(NH₄)₂SO₃
0.5 part dithiodiethanol
Water and ammonia to bring to 100 parts and a pH of 9.3

After reduction the socks were rinsed about 30 minutes in running water and then treated with either sodium lauryl thiosulfate or sodium carboxymethyl thiosulfate, about 250 ml. of 2.4% thiosulfate solution being used per sock. Treatment may be summarized as follows:

| No. Sox | Reducing Lotion Time (Min.) | Reducing Lotion Temp., °F. | Thiosulfate solution | Neutralizer Time, hr. | Temp., °F. | Percent Gain in Weight |
|---|---|---|---|---|---|---|
| 1-6 | 30 | 100 | $C_{12}H_{25}-$ | 66.0 | 100 | 14.6 |
| 7-10 | 30 | 100 | $C_{12}H_{25}-$ | 0.17 | 149 | 12.9 |
| 15-18 | 3 | 100 | $C_{12}H_{25}-$ | 0.083 | 100 | 3.2 |
| 19-24 | 3 | 100 | $C_{12}H_{25}-$ | 4.0 | 100 | 7.9 |
| 11-14 | 30 | 100 | $COOHCH_2-$ | 3.0 | 120 | 2.0 |

Some but not all of the gain in weight of the socks treated with sodium lauryl thiosulfate was due to the attending formation and mechanical retention of a precipitate of lauryl disulfide.

After several washings of the treated and control socks in a home washing machine under normal laundering conditions, the control socks were shrunk to the point of being unwearable. The treated socks, however, were shrink resistant and did not shrink more than commercially available shrink resistant socks which had been obtained from the same manufacturer who supplied the 48 original socks and which were carried along in the test for comparison.

The socks treated with the organic thiosulfates (Nos. 11-24) and the commercially available shrink resistant socks were distributed to users for a wear test and samples treated with either thiosulfate wore as well as the commercial samples used for comparison.

Socks which had received the treatment with thiosulfate were compared with untreated socks and with the commercially available shrink resistant socks for alkali solubility by exposure for 1 hour at 65° C. to 0.1 N sodium hydroxide solution, followed by good rinsing and drying. The loss in weight of the treated socks was equal to or less than that of the original socks before treatment (11.7%) but was appreciably less than that loss in weight (26.2%) noted in the case of the commercially available shrink resistant socks. It is evident from these data that the treatment in accordance with this invention did not adversely affect or damage the wool as measured by alkali solubility.

*Example 11.*—117 parts of sodium chloracetate and 250 parts of sodium thiosulfate were mixed with 458 parts water. The mixture was refluxed for about 8 hours, the solution being kept slightly alkaline by the addition of sodium hydroxide solution from time to time. The resulting solution was cooled and sufficient water was added to bring the total to 865 parts. During the heating of the mixture at reflux temperature, at least some mercaptan was formed by hydrolysis of the organic thiosulfate formed in the reaction.

A piece of wool flannel cloth, 6" x 6", was exposed to a mixture of 40 grams of the above solution and 160 grams of water for 10 minutes at a temperature of 149° F. The pH of the mixture was about 8. After the sample of wool flannel was thoroughly rinsed it was subjected to the washing procedure described in Example 3. The amount of shrinkage occurring during the washing procedure was only 9% as compared with 26% shrinkage in the case of a sample of the original wool cloth similarly treated except for the treatment with the above solution.

Another piece of wool flannel was exposed to a mixture of 40 grams of the above solution and 160 grams of water at a pH of about 8 for 3 hours at 120° F. After the sample of flannel cloth was rinsed, it was subjected to the washing procedure of Example 3. Shrinkage amounted to only 10% as compared with 39% shrinkage in the case of an untreated sample of the same wool cloth. In this latter treatment a strand of hair was threaded through the wool cloth prior to treatment, and examination of the hair after treatment indicated little or no damage by contact with the solution.

*Example 12.*—A swatch of wool flannel, 6" x 6", was oven dried, weighed, and then reduced for 30 minutes at room temperature in an excess of the reducing solution described in Example 10. The reduced wool was rinsed for 20 minutes in running water, then soaked in 200 grams of a 3% solution of ammonium lauryl thiosulfate for 73 hours at 100° F. The piece of flannel was then rinsed and air dried and extracted with alcohol in a continuous Soxhlet extractor. The oven dried cloth showed a gain in weight of 8.3%.

When the cloth was reduced again with the same solution, then rinsed, dried, alcohol extracted and weighed, the gain in weight previously observed disappeared. This loss in weight is interpreted to mean that the organic radical chemically combined in the keratin molecule was liberated as mercaptan which was removed by extraction with alcohol.

*Example 13.*—Two parts sodium bisulfite and 1 part sodium lauryl thiosulfate were mixed with sufficient water and ammonia to make 100 parts and to give a solution having a pH of 5.5. A 6" x 6" swatch of wool flannel, which had been previously extracted with ethanol, was oven dried and weighed, then soaked in 100 ml. of the above solution for 16 hours at 100° F. The treated cloth was then rinsed in running water, extracted with ethanol, air and oven dried, and weighed. The gain in weight was 5%. Area shrinkage in the washing of this sample by the procedure of Example 3 was only 13% as compared with the shrinkage of 40% in the case of an untreated sample of the same cloth.

*Example 14.*—Two parts of sodium hydrosulfite were dissolved in 80 ml. of water and brought to a pH of 9 with concentrated ammonia water. One part of sodium lauryl thiosulfate was then added and sufficient water was introduced to bring the weight to a total of 100 parts. A 6" x 6" swatch of wool flannel, previously alcohol extracted, oven dried and weighed, was soaked in the solution 16 hours at 100° F. After the treatment the fabric was rinsed thoroughly in water, alcohol extracted, air and oven dried, and again weighed. The gain in weight was 2.4%. The area shrinkage in washing the fabric in accordance with the procedure of Example 3 was only 11% as compared with a shrinkage of 40% in the case of a sample of untreated wool flannel from the same source.

*Example 15.*—Two parts of thiourea peroxide and 1 part of sodium lauryl thiosulfate were mixed with water and ammonia to a total weight of 100 parts and an alkalinity of pH 8. A 6" x 6" swatch of wool flannel, previously alcohol extracted and oven dried and weighed, was exposed 16 hours at 100° F. The treated fabric was rinsed thoroughly in water, alcohol extracted, air and oven dried, and again weighed. The gain in weight was 6.2%. The fabric shrank 19% during the washing procedure described in Example 3, while an untreated sample of the same wool flannel shrank 40%.

*Example 16.*—102.4 parts of a 25% solution of disodium carboxymethyl thiosulfate and 12 parts of a 54% solution of ammonium hydrosulfide were combined with sufficient water and acetic acid to bring the weight to a total of 200 parts and the alkalinity to a pH of 9.3. Swatches of wool flannel, each 6" x 6", were exposed to the solution at 100° F. for 1 minute, 5 minutes, and 40 minutes. After exposure the fabrics were thoroughly rinsed in running water for 1 hour, then dried. The amount of shrinkage due to washing in accordance with the procedure of Example 3 was as follows:

| Time of Exposure | Percent Area Shrinkage |
|---|---|
| 1 min | 24 |
| 5 min | 22 |
| 40 min | 9 |
| Control sample | 41 |

The invention as exemplified by the above examples is subject to many variations. For example, the method by which the keratin is reduced to form sulfhydryl groups is not critical in achieving the advantages of my invention, and any of the conventional sulfur-containing reducing agents can be employed. The choice of the reducing agent is of course dependent at least in part on the particular application of the invention. In the treatment of living human hair, for example, it is preferable to use mercaptans such as thioglycerol or thioglycolic acid which have been tested and found to be operative with minimum undesirable damage under the conditions of reduction. As used herein, throughout both the specification and the claims, the term "mercaptan" refers to a compound containing the sulfur analogue of an alcoholic hydroxy group, i. e. the thiol group (—SH), attached to an aliphatic carbon atom. In other words, thiophenols are specifically excluded from the scope of the word mercaptan which can be considered here as being limited to alkyl, alkenyl, and substituted alkyl and alkenyl thiols. A much wider choice of reducing agent is of course available in the treatment of wool, and inorganic sulfides, hydrosulfides, sulfites, hydrosulfites, as well as hydrogen sulfide and compounds like thiourea peroxide can be employed with success in addition to the mercaptans.

Time, temperature, concentrations, and other conditions necessary for adequate degree of reduction have already been explored by those versed in the art and discussion of these details here does not seem necessary for a clear understanding of the invention. It is sufficient to say that conditions should be chosen so that at least some reduction of the keratin disulfide is effected without objectionable degradation of the material undergoing treatment. The actual degree of reduction should preferably be controlled in keeping with the amount of organic thiosulfate to be combined with the wool. In those case, for example, where the introduced organic group has fluorescent, sanitizing, dyeing, etc. properties, a low degree of introduction is adequate and a corresponding low degree of reduction is sufficient. In shrinkproofing, however, a somewhat greater degree of introduction of the organic group is advisable and the amount of reduction may vary from 5 per cent to completion, depending on the degree of shrinkproofing desired, which in turn will depend on the nature of the organic thiosulfate and on the amount combined with the wool.

In the practice of the essential step of the present invention, that is, treatment of the reduced keratin with the organic thiosulfuric acid or water-soluble salt of same, a wide variety of treating agents can be employed. These may be generically identified as alkyl (—$C_nH_{2n+1}$), alkenyl (—$C_nH_{2n-1}$) and substituted alkyl and alkenyl thiosulfates, the term "thiosulfate" being employed to include the acid (hydrogen thiosulfate) as well as water-soluble salts. As far as I am aware the invention is operative irrespective of the nature of substituent groups of the alkyl or alkenyl radical, organic (aliphatic or aromatic) or inorganic, provided the thiosulfate is water soluble, and it is to be noted that even though substituent groups may include halogen atoms, these halogen atoms are un-ionized, and reaction preferentially takes place with ions formed on ionization at the thiosulfate radical. Thus disulfide linkages are formed instead of thioether linkages.

Straight chain alkyl and alkenyl thiosulfates such as propyl, lauryl and oleyl thiosulfates, as well as compounds having side chains in the alkyl radical such as isopropyl and tertiary butyl thiosulfates, can be successfully employed and the number of carbon atoms in the alkyl, alkenyl or substituted alkyl and alkenyl radicals can vary over a wide range provided the thiosulfate is water-soluble. In this connection organic thiosulfates having from 1 to 18 carbon atoms are soluble in water and are useful in the practice of the invention. Of course a greater number of carbon atoms in the organic group can be tolerated when weekly ionized water-solubilizing substituents, such as OH, COOH, and $NH_2$, are present in the radical.

The physical properties of the modified products of my invention will vary depending at least in part on the character of the organic radical introduced, the nature of the substituent groups showing particular influence. Thus, partly in review, I have found that improved wettability is imparted to wool by the introduction of a low molecular weight organic radical containing a substituent carboxyl group (e. g. use of carboxymethyl thiosulfate). Greater receptivity to color dyeing has been noted in the case of wool which has been reduced and treated with propyl thiosulfate in accordance with my invention. The use of glyceryl thiosulfate and lauryl thiosulfate to fix reduced hair in permanent hair waving has been observed to impart improved luster and feel to living human hair. By "living" hair is meant hair which is still attached to the living body, from the cells of which it grew and developed. In addition, the process of my invention provides means for effecting changes in the physical properties of wool by the introduction of organic radicals having, for example, fluorescent or germicidal properties. It is to be noted that in all cases where organic radicals have been combined with the keratin of wool through the disulfide linkage in accordance with my invention, increase in weight of the reduced wool after treatment with the thiosulfate and reduction in the tendency to shrink have been observed.

The process of my invention is conducted in aqueous medium, thereby permitting ready ionization of the thiosulfate and the reduced keratin and establishing conditions favoring rapid and complete reaction.

The hydrogen ion concentration of the solution containing the thiosulfate is preferably maintained at a pH from about pH 7 to about pH 9.5 during contact with the reduced keratin substance, but a wider range of hydrogen ion concentration can be employed, such as pH 4 to pH 10.5 provided due precautions are observed as to concentration and temperature of treatment whereby damage and degradation of the keratin-containing substance is held at a minimum. In the case of the treatment of reduced living hair alkaline conditions effected by use of ammonia or substituted ammonium compounds are preferred, but in the treatment of reduced wool, alkalinity may be effected when desired by judicious use of other alkalizing materials such as sodium or potassium hydroxide. Under alkaline conditions, of course, appropriate water-soluble thiosulfate salts are preferably used.

The temperature at which the thiosulfate is reacted with the reduced keratin is not critical, room temperature to 100° F. being preferred. However, depending on the stability of the organic thiosulfate, higher temperatures, for example up to about 212° F., may be employed and such temperature will be found to be advantageous in certain situations wherein a high rate of reaction is essential, but more accurate control of the reaction must be exercised in order to prevent undesirable side reactions which may occur at the higher temperatures, especially if the alkalinity of the solution is pH 9 or above. If complete reaction between the organic thiosulfate and the reduced keratin is desired, the duration of the contact may be determined by periodically subjecting the keratin-containing substance under treatment to the conventional nitroprusside test and continuing contact with the organic thiosulfate until a negative test for sulfhydryl is obtained. The actual time for the reaction will vary, of course, depending on temperature, concentration, and nature of the thiosulfate.

In the above examples I have shown that the reaction with organic thiosulfate in accordance with the invention may be conducted separately on reduced keratin, or simultaneously with the reducing step by employment of a solution containing both a reducing agent such as mercaptan and also the thiosulfate. In this latter procedure the mercaptan is available for chemical reduction of the keratin-containing substance to form sulfhydryl groups and the thiosulfate is available for reaction with the reduced keratin whereby the new disulfide linkages are formed. Thus some of the reduced keratin can immediately react with the thiosulfate, advantageously minimizing excessive reduction and consequent damage. Such solutions in which the reducing agent is a mercaptan are covered in my application Serial No. 211,183, filed February 15, 1951. Of the solutions disclosed in the above application, those in which the molar amount of thiosulfate including mixtures of different thiosulfates is greater than the molar amount of mercaptan find especial use in the practice of the one-step process herein referred to. In the case of those solutions which are adapted for use in this one-step process, compatibility of the mercaptan and thiosulfate is advantageous, that is, it is desirable that all disulfides which are formed in the equilibrium reaction occurring on combination of thiosulfate with mercaptan be soluble in aqueous medium. Complete and permanent solubility, however, is not essential because the solutions can be employed with success at any time prior to the formation of a precipitate of insoluble disulfide. Moreover, one-step treatments of keratin-containing substances such as hair or wool to form kSSR were successfully carried out when the disulfide corresponding to the thiosulfate employed was insoluble, especially by use of reducing agents which are compatible with the thiosulfate, which are capable of reacting with the disulfide linkages of keratin to produce sulfhydryl groups but which are non-sulfhydryl themselves, as for example aqueous solutions of thiourea peroxide, of water-soluble sulfites and bisulfites, and of water-soluble hydrosulfites in alkaline medium. Gains in weight and resistance to shrinkage resulted from treatments in accordance with this latter procedure, and such treatments, as well as mixtures of such reducing agents with thiosulfates suitable for use in the treatments, are contemplated as part of the present invention.

It is my belief that the products of the reaction hereinabove described represent new and useful products in the art and my belief that organic groups are combined with the keratin through a disulfide linkage is supported by reproduced evidence showing (1) a gain in weight on treatment of wool in accordance with the process, (2) an improved luster and condition of hair treated in accordance with the process, and (3) a greater shrink resistance possessed by wool treated in accordance with the process as compared with the shrink resistance of reduced wool, and unreduced wool treated with thiosulfate.

Having thus described my invention in such manner that the nature thereof may be fully understood by others, I declare that what I claim is:

1. In the process of treating keratin-containing substance to modify chemical and physical characteristics thereof, wherein the said substance is subjected to the action of a sulfur-containing reducing agent and disulfide linkages of keratin are converted to sulfhydryl groups, the separate step of reacting the previously reduced keratin at a pH from about 4 to about 10.5 with an aqueous solution of at least one organic thiosulfate of the group consisting of alkyl, alkenyl and substituted alkyl and alkenyl thiosulfuric acids and water-soluble salts of same to convert reduced keratin to disulfide containing the organic group of said organic thiosulfate.

2. Process of claim 1 in which the reduced keratin is rinsed substantially free of reducing agent before reaction with the thiosulfate.

3. Process of claim 1 in which the reaction with the thiosulfate is continued until sulfhydryl groups are substantially eliminated.

4. Process of claim 1 in which the thiosulfate is a carboxy alkyl thiosulfate.

5. Process of claim 1 in which the reduced keratin is reduced wool keratin and the thiosulfate is a carboxy alkyl thiosulfate.

6. Process of claim 1 in which the thiosulfate is an alkyl thiosulfate having from 1 to 18 carbon atoms in the alkyl radical.

7. Process of treating keratin-containing substance to modify chemical and physical characteristics thereof which comprises contacting the keratin-containing substance with an aqueous solution at pH 4 to 10.5 of a mercaptan and more than an equimolar amount of thiosulfate made up of at least one organic thiosulfate of the group consisting of alkyl, alkenyl and substituted alkyl and alkenyl thiosulfuric acids and water-soluble salts of same, and rinsing the solution from the treated keratin-containing substance.

8. Process of claim 7 in which the mercaptan is a thioglycolate, the thiosulfate is carboxymethyl thiosulfate, and the pH of the solution is from pH 7 to pH 9.5.

9. Process of forming disulfide linkages in reduced hair which comprises treating the previously reduced hair with an aqueous solution of at least one thiosulfate of the group consisting of alkyl, alkenyl and substituted alkyl and alkenyl thiosulfuric acids and water-soluble salts of same.

10. Process of claim 9 in which the thiosulfate is lauryl thiosulfate.

11. Non-living keratin-containing fiber in which at least some disulfide linkages are of the type

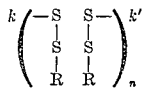

wherein $k$ and $k'$ represent polypeptide chains, R is selected from the group consisting of alkyl, alkenyl and substituted alkyl and alkenyl radicals, and $n$ is a number greater than 1.

12. Non-living keratin-containing fiber of claim 11 in which R is alkyl having from 1 to 18 carbon atoms.

13. Non-living keratin-containing fibers of claim 11 in which R is lauryl.

14. Non-living keratin-containing fibers of claim 11 in which R is carboxymethyl.

15. As a new composition a mixture of a sulfur-containing but non-sulfhydryl water-soluble reducing agent for keratin and at least one water-soluble organic thiosulfate of the group consisting of alkyl, alkenyl, and substituted alkyl and alkenyl thiosulfates.

16. Composition of claim 15 in which the reducing agent is thiourea peroxide.

17. Composition of claim 15 in which the reducing agent is a water-soluble sulfite.

18. Composition of claim 15 in which the reducing agent is a water-soluble hydrosulfite.

19. Process of treating keratin-containing substance to modify chemical and physical characteristics thereof which comprises contacting the keratin-containing substance with an aqueous solution at pH 4 to 10.5 of sulfur-containing but non-sulfhydryl reducing agent in admixture with at least one thiosulfate of the group consisting of alkyl, alkenyl and substituted alkyl and alkenyl thiosulfuric acids and water soluble salts of same, and rinsing the solution from the treated keratin-containing substance.

JOHN W. HAEFELE.

REFERENCES CITED

The following references are of record in the file of this patent:

UNITED STATES PATENTS

| Number | Name | Date |
|---|---|---|
| 2,012,073 | Schirm | Aug. 20, 1935 |
| 2,238,672 | Arthur | Apr. 15, 1941 |
| 2,418,071 | Harris | Mar. 25, 1947 |
| 2,483,008 | Higgins | Sept. 27, 1949 |
| 2,508,714 | Harris | May 23, 1950 |
| 2,517,572 | Jones et al. | Aug. 8, 1950 |

OTHER REFERENCES

Speakman, "The Chemistry of Wool and Related Fibres," Journal of the Textile Institute, July 1941, pages T83–T108, especially at bottom of page T106.

Speakman et al., "The Reactivity of the Sulphur Linkage in Animal Fibres, Part V," Journal of the Society of Dyers and Colourists, March 1941, pages 73 to 81, especially at page 75, column 1, page 78, page 81, top of column 1.

Footner et al., "Reactions of Organic Thiosulphates," Chemical Society Journal, volume 127, July to December 1925, pages 2887 to 2891, especially pages 2887 and 2889.

Gilman, "Organic Chemistry," volume 1, Second Edition, 1943, John Wiley and Sons, New York, pages 908, 910.

Geiger et al., "Chemically Modified Wools of Enhanced Stability," American Dyestuff Reporter, March 1, 1943, volume 32, number 5, pages 99–104.

Patterson et al., "The Role of Cystine," American Dyestuff Reporter, August 18, 1941, volume 30, number 17, pages 425 to 430, 447, 448.